2,462,116

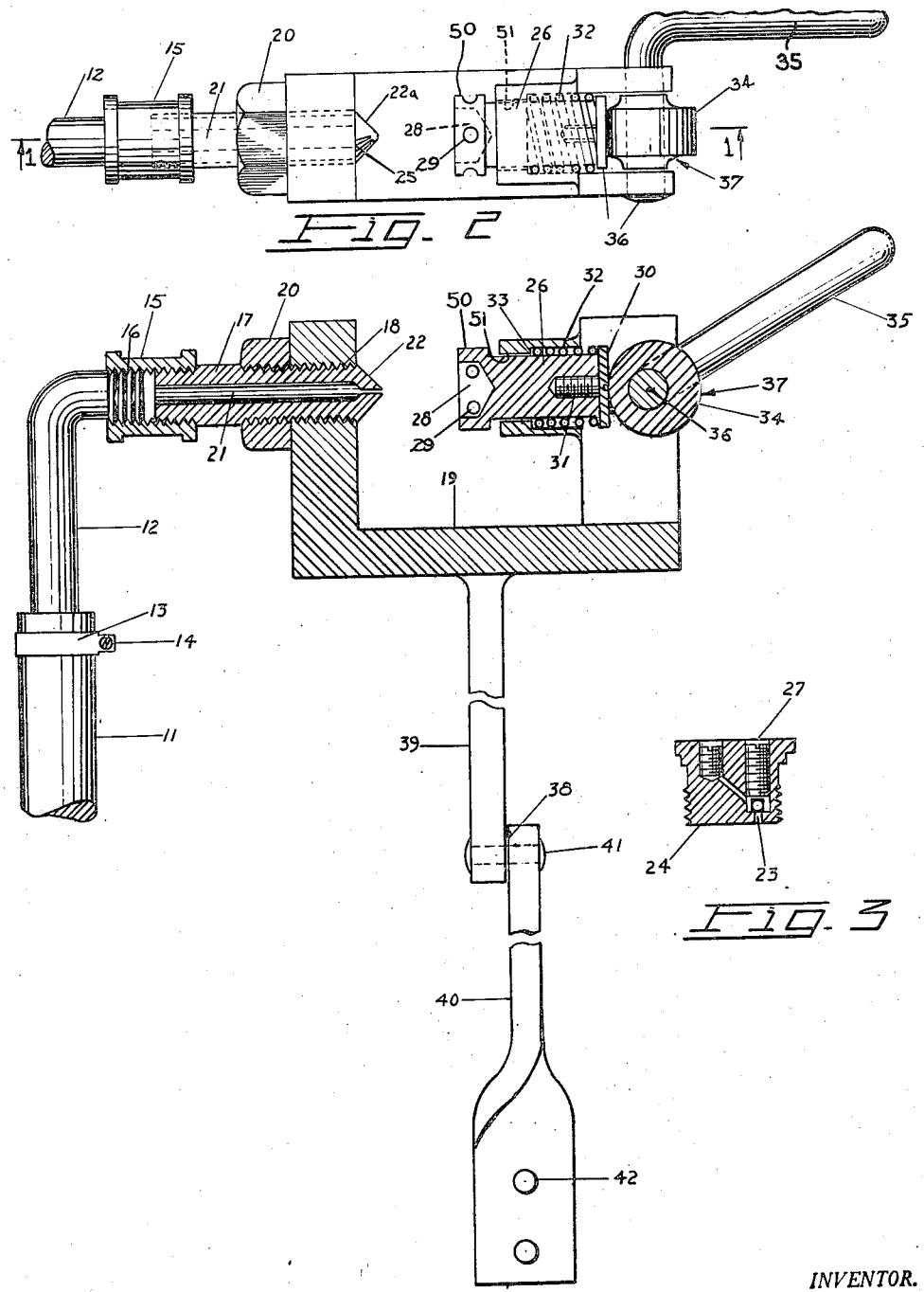
Feb. 22, 1949.   A. MacLACHLAN   2,462,116
LEAK TESTING FIXTURE FOR VALVES
Filed May 28, 1946
INVENTOR.
ANGUS MAC LACHLAN
BY
ATTORNEY Patented Feb. 22, 1949

UNITED STATES PATENT OFFICE 2,462,116

LEAK TESTING FIXTURE FOR VALVES

Angus MacLachlan, New York, N. Y.

Application May 28, 1946, Serial No. 672,903

1 Claim. (Cl. 73—40)

(Granted under the act of March 3, 1883, as amended April 30, 1928; 370 O. G. 757)

This invention relates in general to a testing fixture, and in particular to a quick-action test fixture for testing air valves.

It is an object of this invention to provide a mechanism for quick testing for leakage in air valves.

It is another object to provide a mechanism to test air valves by forcing air under pressure into the valve which is being held in a temporary test position by use of a simple valve-holding mechanism.

It is an additional object to provide a movable valve holder that can be inserted into liquid to test for leakages.

It is a still additional object to provide a means for quickly clamping a valve into a valve-holding mechanism so that the valve may be tested.

Further objects and advantages of this invention, as well as its construction, arrangement and operation, will be apparent from the following description and claims in connection with the accompanying drawings, in which, Fig. 1 is a front elevation, partly in section on line 1—1 of Fig. 2, of a machine embodying one form of the invention, Fig. 2 is a plan view of the machine of Fig. 1, and Fig. 3 is a view in section of a valve to be tested.

There is shown in Fig. 1 a rubber hose 11 which is attached to a short pipe elbow 12 and is held fast to the pipe elbow 12 by means of clamp 13, the latter being tightened by screw 14. The pipe elbow 12 is mounted on the coupling 15, for example by threads 16, which links it with the valve-fitting fixture 17. The valve-fitting fixture 17 is attached to the frame 19 by means of screw threads 18, the lock nut 20 being included in the attachment. A fluid passage 21 extends through the valve-fitting fixture 17 to the conical tip 22 thereof which fits the aperture or opening 23 of valve 24 and forms a seat for the selected aperture 23. Suitable fluid under pressure is supplied from any suitable source through hose 11 to passage 21 which communicates with the valve aperture 23 through the seat 22. Air under pressure of between 15 and 25 pounds per square inch has been found suitable for testing the valves 24.

The plunger 26 comprises the abutment head 50, which fits the valve 24 on the side 27 thereof opposite the aperture 23. The frame 19 supports the plunger 26 with its abutment head 50 disposed in opposed relationship to the seat 22 as shown, and comprises the bore 51 that serves as a guideway for movement of the plunger 26 towards and away from the fitting 17. The bore 51 is counterbored as shown to house the compression spring 32, the shoulder 33 being thereby provided to serve as a seat for one end of the spring 32. The screw 31 comprises the enlarged head 30 that overhangs the periphery of the plunger 26 to provide a seat for the other end of the spring 32, the head 30 also serving to confine the spring 32 in the housing of the guideway 33.

The plunger 26 is actuated towards the fitting 17 opposed to the tension of spring 32 by the actuating mechanism, generally designated 37, which comprises the cam 34, operated by means of the lever 35 attached thereto. The head 30 of screw 31 serves as a cam follower for cam 34. The lever 35, and the cam 34 attached thereto, is mounted to rotate relative to frame 19 on the pine 36, manual rotation of the lever 35 in the counter-clockwise direction in Fig. 1 operating to press the abutment head 50 against the side 27 of valve 24, and operating to hold the valve aperture 23 in firm seating engagement with the conical tip 22 of the fixture 17. Manual release of lever 35 operates to move the plunger 26 away from the valve 24 under action of spring 32, and the valve 24 thereby falls away from the tip 22 into any suitable container positioned to receive the tested valves 24.

The abutment head 50 of the plunger 26 is provided with the recess 28. Any fluid under pressure from the passage 21 into the aperture 23 of valve 24 that is able to leak because of leakage in the valve 24 escapes into the recess 28, and apertures 29 are provided in recess 28 to permit escape of such leaking pressure fluid outside the head 50 of plunger 26.

The frame 19 is pivoted around a lapping joint 38 which is made by leg 39 and handle or base 40 hinged together by pin 41. This lapping joint 38 allows the entire testing mechanism to be pivoted and immersed into a container of oil or the like placed nearby. The handle or base 40 adapts the testing device to be attached to a bench or similar foundation for operation, for example by bolts or screws through the holes 42.

The operation of the device is as follows: The valve opening 23 of valve 24 is placed over the taper 22 of the valve-fitting fixture 17 and the valve-holding assembly comprising plunger 26 is then moved tightly against the valve side 27 by means of the cam mechanism 37. Air under pressure from hose 11 passes through the passage 21 and tip 22 of the valve-fitting fixture 17 into the aperture 23 of valve 24. The mechanism is then pivoted about pin 41 and immersed into liquid to test for leakage through valve 24 by air bubbles which escapes through apertures 29 of the recess 28.

The simplicity of this invention allows an unskilled operator to test many times the number of valves that a man formerly was able to test in the same time, and permits the test to be performed without marring or injuring the valves.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

In valve testing apparatus, a fitting comprising a conical seat which fits a predetermined aperture of the valve, a plunger comprising an abutment head which fits the valve opposite the aperture, a frame supporting the fitting and supporting the plunger with its abutment head in opposed relationship to the seat, the frame comprising a guideway for movement of the plunger towards or away from the fitting, actuating mechanism including a cam operable to actuate the plunger towards the fitting and to hold the valve with the selected aperture thereof in seating engagement with the seat, a fluid passage through the fitting and extending through the seat in communication with the selected valve aperture, a base comprising a mounting for the frame enabling its movement relative to the base, the mounting comprising a connection controlling movement of the apparatus in a direction laterally and downwardly to a position laterally away from the base.

ANGUS MacLACHLAN.

REFERENCES CITED

The following references are of record in the file of this patent:

UNITED STATES PATENTS

| Number | Name | Date |
|---|---|---|
| 699,539 | Lewis | May 6, 1902 |
| 704,267 | Norton | July 8, 1902 |
| 1,572,158 | Mueller et al. | Feb. 9, 1926 |
| 1,590,394 | Rawlings | June 29, 1926 |
| 1,637,956 | Moriarty | Aug. 2, 1927 |
| 1,699,481 | Stevens | Jan. 15, 1929 |